US011167592B2

(12) United States Patent
Wilson et al.

(10) Patent No.: US 11,167,592 B2
(45) Date of Patent: Nov. 9, 2021

(54) VEHICLE WITH TRACK WIDTH LEARNING MODE

(71) Applicant: Ford Global Technologies, LLC, Dearborn, MI (US)

(72) Inventors: Scott Wilson, Farmington Hills, MI (US); Andrew Monticello, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 16/225,597

(22) Filed: Dec. 19, 2018

(65) Prior Publication Data

US 2020/0198397 A1 Jun. 25, 2020

(51) Int. Cl.
*B60B 35/10* (2006.01)
*G06N 20/00* (2019.01)

(52) U.S. Cl.
CPC ........ *B60B 35/1063* (2013.01); *B60B 35/109* (2013.01); *B60B 35/1045* (2013.01); *G06N 20/00* (2019.01)

(58) Field of Classification Search
None
See application file for complete search history.

(56) References Cited

U.S. PATENT DOCUMENTS

| 6,282,479 | B1 * | 8/2001 | Ghoneim | B60T 8/17551 |
| | | | | 303/140 |
| 8,517,135 | B2 * | 8/2013 | Schapf | B60G 7/006 |
| | | | | 180/233 |
| 9,643,605 | B2 * | 5/2017 | Pawlicki | B60W 10/20 |
| 2005/0189163 | A1 * | 9/2005 | Barton | B62D 6/003 |
| | | | | 180/446 |
| 2007/0294009 | A1 * | 12/2007 | Yasui | B60T 8/1769 |
| | | | | 701/41 |
| 2014/0005889 | A1 * | 1/2014 | Hayakawa | B60G 17/01933 |
| | | | | 701/38 |
| 2015/0066295 | A1 * | 3/2015 | Kanda | B60G 17/01933 |
| | | | | 701/38 |
| 2015/0290995 | A1 * | 10/2015 | Kanda | B60G 17/0182 |
| | | | | 701/37 |
| 2019/0152471 | A1 * | 5/2019 | Mitsumoto | B60W 30/12 |
| 2019/0293432 | A1 * | 9/2019 | Demiral | B62D 15/021 |

FOREIGN PATENT DOCUMENTS

| CN | 107798855 A | 3/2018 | |
| DE | 102016223902 B4 * | 12/2019 | ............ B60W 40/12 |
| GB | 2424630 A | 10/2006 | |
| NZ | 539543 A | 4/2005 | |
| WO | 2012084827 A1 | 6/2012 | |

OTHER PUBLICATIONS

German to English translation of DE 10 2016 223 902 B4 per Google Patents (based on application DE102016223902.3A filing date) (Year: 2016).*

* cited by examiner

*Primary Examiner* — Thomas E Worden
(74) *Attorney, Agent, or Firm* — David B Kelley; Brooks Kushman P.C.

(57) ABSTRACT

A vehicle includes an axle having driven wheels each with an associated wheel-speed sensor and the vehicle includes a yaw rate sensor. A controller is programmed to, responsive to a request to reprogram a track width of the driven axle, receive signals from the wheel speed sensors and the yaw rate sensor to learn a track width of the driven axle based on the signals.

12 Claims, 5 Drawing Sheets

VEHICLE WITH TRACK WIDTH LEARNING MODE

TECHNICAL FIELD

This disclosure relates to vehicles with a track width learning mode in which the vehicle calculates a track width of one or more axles.

BACKGROUND

A typical rear-wheel-drive vehicle includes an engine that is coupled to a transmission. The transmission includes an input shaft operably coupled to a crankshaft of the engine. The transmission is configured to change a speed ratio between the transmission input shaft and a transmission output shaft. The transmission output shaft is coupled to a differential by a driveshaft. The differential is associated with a driven axle (rear axle) of the vehicle and transmits torque, received from the driveshaft, to a pair of half shafts. The differential includes gearing that modifies the received torque by a final drive ratio and permits speed differences between the half shafts to facilitate cornering of the vehicle. Each half shaft includes an associated driven wheel that propels the vehicle. The vehicle also includes a front axle (undriven axle) that includes a pair of undriven wheels that are not powered by the engine.

SUMMARY

According to one embodiment, a vehicle includes an axle having driven wheels each with an associated wheel-speed sensor and the vehicle includes a yaw rate sensor. A controller is programmed to, responsive to a request to reprogram a track width of the driven axle, receive signals from the wheel speed sensors and the yaw rate sensor while the vehicle is moving in a particular manner to learn a track width of the driven axle based on the signals.

According to another embodiment, a vehicle includes an axle having driven wheels and a controller. The controller is programmed to, responsive to a request to enter track width learning mode, calculate a track width of the driven axle derived from wheel speeds of the driven wheels divided by vehicle yaw rate. If learning conditions are satisfied during the calculation of the track width, update a rolling average of track widths with the track width, otherwise, discard the track width. The controller is further programmed to, responsive to a timer expiring, rewrite a previously stored track width in permanent memory with the rolling average.

According to yet another embodiment, a method of learning a track width of a vehicle includes receiving a request to reprogram a track width of a driven axle and, responsive to the request, issuing driving instructions to a driver. The method also includes measuring wheel speeds of wheels associated with the driven axle, measuring yaw rate of the vehicle, and calculating a track width of the driven axle based on the measured wheel speeds and the measured yaw rate.

According to a further embodiment, a vehicle includes an axle having driven wheels each with an associated wheel-speed sensor and the vehicle includes a yaw rate sensor. A controller is programmed to, responsive to a request to reprogram a track width of the driven axle, issue driving instructions to a driver, and receive signals from the wheel speed sensors and the yaw rate sensor while the driving instructions are executed to learn a track width of the driven axle based on the signals.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
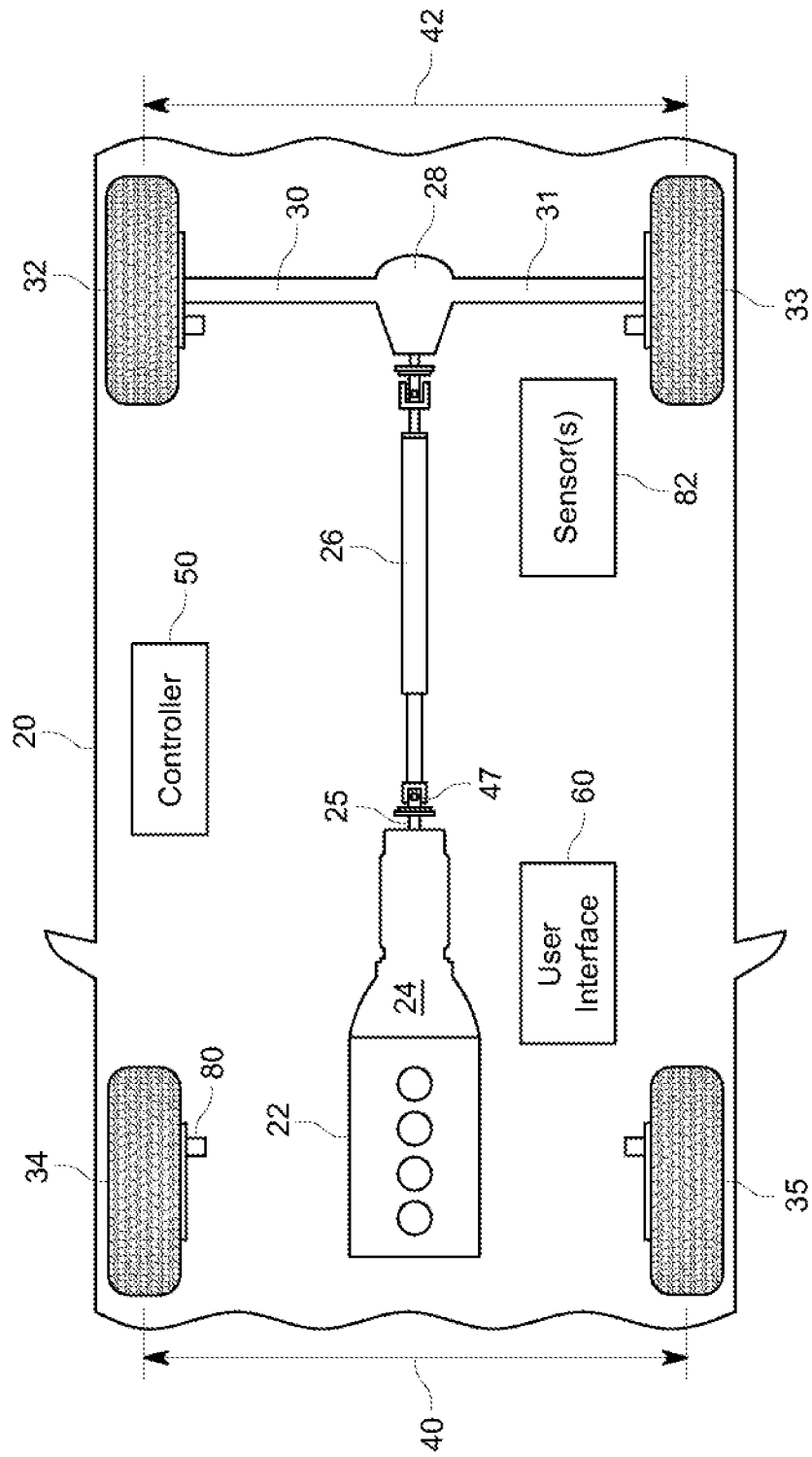
FIG. 1 is a diagrammatical view of a vehicle.

Referring to FIG. 1, a vehicle 20 (such as the illustrated front engine, rear-wheel drive vehicle or a front-wheel-drive or all-wheel-drive vehicle in other embodiments) may include an engine 22 and a transmission 24. The transmission 24 includes an output shaft 25 coupled to a front end of a driveshaft 26. A rear end of the driveshaft 26 is coupled to a rear differential 28 or similar device. The driveshaft 26 may be coupled via universal joints (U-joints), constant-velocity joints (CV Joints), or the like. The driveshaft 26 transmits power from the transmission 24 to a final drive disposed within the rear differential 28. The final drive is driveably connected to the rear wheels 32, 33 via rear half shafts 30, 31. (The differential 28 and the half shafts may be referred to collectively as a rear axle, which is a driven axle this example.) The vehicle 20 also includes front wheels 34 and 35, which are undriven wheels that are not powered by the engine. Herein, "driven" refers to components that propel the vehicle, i.e., components of the powertrain, and "undriven" refers to components that are not part of the powertrain.

Track width is a vehicle measurement that refers to the distance between the centerline of two roadwheels on the same axle. The centerline of each wheel is located at a center of the contact patch of the tire. The vehicle 20 includes a front track width 40 (sometimes referred to as front track) and a rear track width 42 (sometimes referred to as rear track). Vehicle designers determine appropriate front 40 and rear 42 tracks for vehicles and accomplish those track widths by selecting appropriately sized wheels, tires, suspension components, etc. These track widths may be referred to as the factory track widths. The factory track widths can be maintained over the life of the vehicle by replacing wear parts, e.g., tires, with original equipment manufacturer (OEM)

components and by maintaining factory settings, e.g., suspension settings. In practice, however, vehicles owners may replace components with non-OEM parts and/or may re-tune the vehicle such that the track widths 40 and 42 differ from the factory track widths. Some vehicles, such as the vehicle 20, may utilize one or more of the track widths 40 and 42 in controlling systems of the vehicle. In these vehicles, the track widths are programmed into memory of a vehicle controller 50 that uses the track widths during computations executed to control aspects of the vehicle such as the powertrain, the traction control system, or others.

While illustrated as one controller, the controller 50 may be part of a larger control system and may be controlled by various other controllers throughout the vehicle 20, such as a vehicle system controller (VSC). It should therefore be understood that the controller 50 and one or more other controllers can collectively be referred to as a "controller" that controls various actuators in response to signals from various sensors to control functions such as the powertrain. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from the engine 22, the transmission 24, the differential 28, and various sensors. Although not explicitly illustrated, those of ordinary skill in the art will recognize various functions or components that may be controlled by controller 50 within each of the subsystems identified above.

The differential 28 may be an electronic limited-slip differential (eLSD) that is controlled by the controller 50. The differential 28 may include a clutch pack configured to distribute unequal amounts of torque to the half shafts 30, 31 in order to individually control the wheel speed differential between the driven wheels 32, 33. The clutch pack is electronically controlled by the controller 50. For example, the controller 50 may be programmed to provide control signals to a hydraulic circuit (not shown) to supply hydraulic pressure of various magnitudes to the clutch pack to increase and decrease torque capacity of the clutch. Of course, other types of eLSDs are known that are not hydraulic and this application is not limited to any particular type of eLSD. In a front-wheel drive embodiment, the front differential may be an eLSD that is capable of controlling the wheel speed delta of the front driven wheels. In an all-wheel drive embodiment, the vehicle may include both a front and rear eLSD or only one eLSD at the front or rear axle.

Handling parameters of the vehicle 20 can be modified by increasing or decreasing slip within the clutch pack of the differential 28 or any other eLSD on the vehicle 20. In the illustrated embodiment, the differential 28 is controllable by the controller 50 to induce understeer or oversteer when advantageous. The controller 50 controls the operational state of the clutch pack based on one or more algorithms stored within memory of the controller 50. These algorithms may use the stored rear track width 42 during one or more calculations related to controlling the differential 28. (If the vehicle 20 includes multiple eLSD, the controller will be programmed with algorithms and a track width associated with that eLSD.) If the track width stored in the controller 50 does not match the actual track width (for example, the preprogrammed factory track width is no longer valid due to larger after-market tires being installed), the effectiveness of the controller 50 to operate the differential 28, or other differential, may be diminished.

To avoid the above-described problems, the vehicle 20 includes a track width learning mode that allows a user to reprogram the track width stored within the controller 50 following a hardware or tuning change that altered the front track 40 and/or the rear track 42. Depending upon the vehicle, the learning mode may be for the front track, the rear track, or both.

Figure 2:
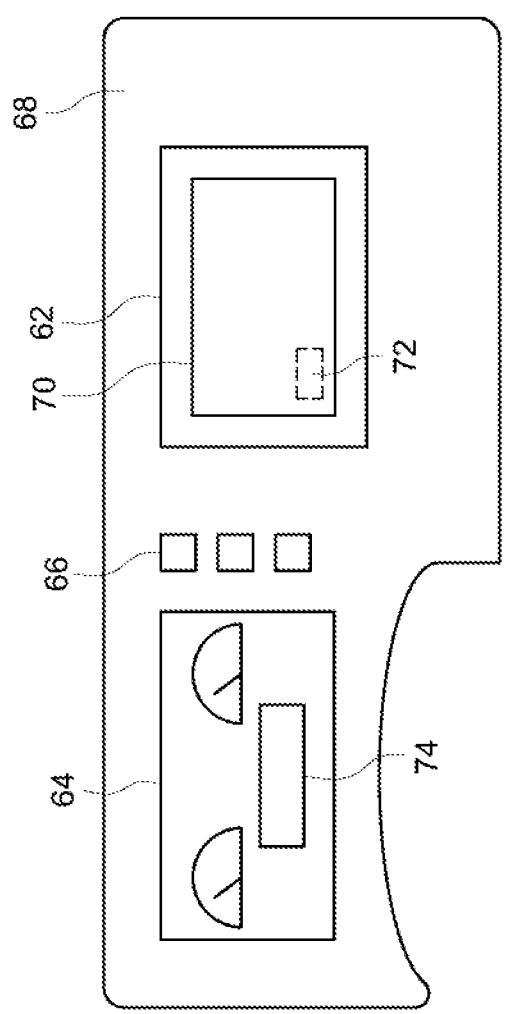
FIG. 2 is a diagrammable view of a vehicle dash having a user interface for use with a track width learning mode.

Referring to FIGS. 1 and 2, the track width learning mode may be requested by the driver via a human-machine interface 60. The user human-machine interface 60 may include one or more displays, buttons, touch screens, keyboards, microphones, and speakers that are in electric communication with the controller 50 and that allow communication between the controller 50 and the driver. For example, the human-machine interface 60 may include a radio head 62, an instrument cluster 64, and buttons 66 disposed on a dash 68. The radio head 62 may include a display 70 having capacitive touch elements 72. The instrument cluster 64 may include a second display 74. The driver may initiate track width learning mode by toggling, via the buttons 66 or the touch 72, to the appropriate menu shown on the displays 70 and/or 72 and selecting track width learning mode. In one or more embodiment, the vehicle 20 may be configured to communicate with an application running on a remote device such as a cell phone. Here, a driver may access track width learning mode via the application. Once track width learning mode is selected, a learning-mode interface is displayed on one or more of the displays to provide instructions to the driver. (This will be described in more detail below.)

During track width learning mode, the vehicle is driven in a semi-specific manner while various sensors of the vehicle take measurements in order to calculate the track width of a driven axle. Generally, the vehicle is driven through a series of low speed turns in a large parking lot or other suitable area. The track width learning mode requires the driver the operate the vehicle for a specified period of time, e.g., 30 seconds, and determines a new track width by averaging valid calculated track widths computed during the time period. The sensors may include wheel speed sensors 80 that are each associated with one of the wheels. The wheel speed sensors 80 are in electric communication with the controller 50 and are configured to output a signal indicative of the sensed wheel speed. The vehicle 20 may include one or more sensors 82 configured to determine accelerations of the vehicle. For example, the one or more sensors 82 are in electric communication with the controller 50 and are configured to output signals indicative of sensed conditions. The sensors 82 may include a yaw-rate sensor, a lateral-acceleration sensor, and a longitudinal-acceleration sensor. Used herein, "acceleration" refers to both positive acceleration (propulsion) and negative acceleration (braking). The yaw-rate sensor generates a yaw-rate signal corresponding to the yaw rate of the vehicle. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. In some embodiments, the yaw rate, lateral acceleration, longitudinal acceleration, and other measurements may all be measured by a single sensor. Readings from the sensors are used not only to calculate the new track width but also to ensure that the vehicle 20 is being driven in a manner conducive to reprogramming of the track width.

During track width learning mode, the driver may be required to maintain the vehicle within a yaw-rate envelope, a speed envelope, a lateral-acceleration envelope, a longitudinal-acceleration envelope, a propulsion-torque envelope, steering-wheel-angle envelope, and a differential torque envelope. Each envelope may include an upper threshold and a lower threshold (in some instances the lower threshold may be zero). For example, the driver may be required to maintain vehicle speed between 15 to 30 kilometers per hour (KPH). If the vehicle leaves any of the envelopes during the learning mode, the vehicle may issue braking, steering, and/or acceleration instructions to the driver. These instructions may be communicated to the driver via one or more of the displays 70, 74 or any other available vehicle communication, e.g., auditory. Learning mode may be paused responsive to any of the above-described envelopes being violated and restarted once meet. Learning mode may be exited responsive to the vehicle coming to a stop or is outside of the defined envelop for a threshold amount of time. Track widths calculated when the vehicle is outside of the envelopes may be discarded and the track width may only be updated if a sufficient amount of data is obtained during the learning mode.

According to one embodiment, the yaw-rate envelope may be between 6-8 degrees per second, the lateral-acceleration envelope may be between 2-4 meters per second squared (m/s$^2$), the speed envelope may be between 15 to 30 KPH, the longitudinal-acceleration envelope may be between 0-1 m/s$^2$, the differential torque envelope may be between 0-250 Newton meters (Nm), the steering-wheel-angle envelope may be between 25-60 degrees, and the propulsion-torque envelope may be between 300-600 Nm. These are merely examples envelopes and the specific envelopes will be dependent upon individual vehicle attributes. As such, this listing is for illustrative purposes only and is not limiting.

The track width may be calculated based on wheel speeds and yaw rate. In one embodiment, track width is calculated using equation 1, where $V_i$ is wheel speed of inside driven wheel, $V_o$ is wheel speed of outside driven wheel, $V_m$ is wheel speed of the fastest undriven wheel, and W is yaw rate.

$$\text{Track Width} = \left[ \frac{\left(\left(\frac{V_o - V_i}{2}\right) - V_m\right) \times 0.2778}{w \times 0.0175} \right] \times 2 \qquad \text{EQ. 1}$$

Figure 3:
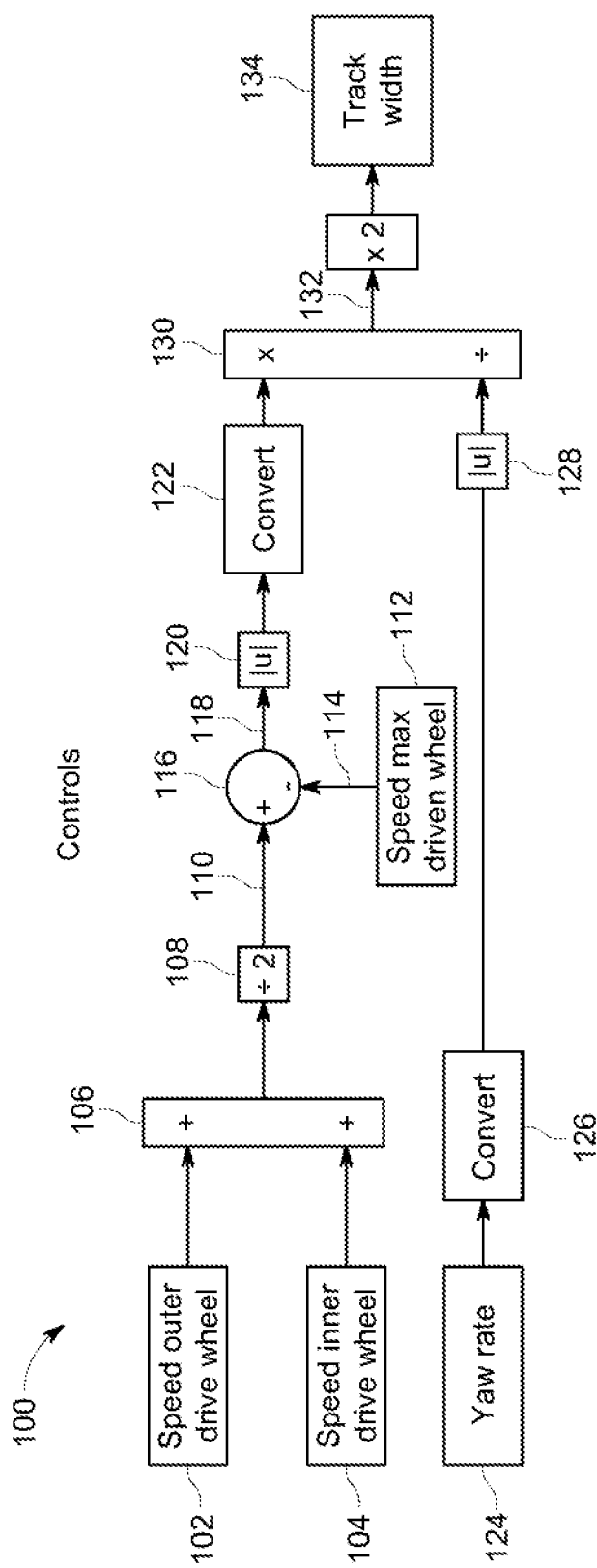
FIG. 3 illustrates a control diagram for calculating track width of an axle.

Referring to FIG. 3, controls 100 for calculating the track width of a driven axle will now be described. The controls 100 utilize equation 1 for calculating the track width. The controls 100 begin by receiving signals from the wheel speed sensors 80 such as the speed of the outer driven wheel 102 and the speed of the inner driven wheel 104. (The vehicle is navigated through turns during learning mode and the outer driven wheel is the wheel located on the outside of the turn, and the inner driven wheel is the wheel located on the inside of turn. For example, for a left turn, wheel 32 is the outer driven wheel and wheel 33 is the inner driven wheel.) The wheel speeds 102, 104 are added together at operation 106 and are divided by two at operation 108 to calculate an average speed of the driven wheels 110. At operation 112 the controller receives the speeds of the undriven wheels and outputs the fastest one of the undriven wheels as the maximum undriven wheel speed 114.

The maximum undriven wheel speed 114 is subtracted from the average driven wheel speed 110 at operation 116 to calculate the speed offset 118. An absolute value of the speed offset 118 is performed at operation 120, and a unit conversion of the absolute value of the speed offset 118 is performed at operation 122. For example, the speed offset may be in kilometers per hour and may be converted to meters per second by multiplying by 0.2778 to be compatible with the yaw rate. A first order filter may be applied prior to operation 122.

The controller 50 receives the yaw rate from the yaw-rate sensor 82 at operation 124. The yaw rate may be measured in degrees per second and may be converted at operation 126 to radians per second. An absolute value of the yaw rate may be performed at operation 128. While not shown, filtering may be performed on the absolute value of the yaw rate. At operation 130, the speed offset 118 is divided by the yaw rate to calculate a distance 132 from a center of the vehicle to the outside driven wheel. Essentially, the distance 132 is one half of the track width of the driven axle. The distance 132 is multiplied by two to compute the track width 134 of the driven axle.

Figure 4:
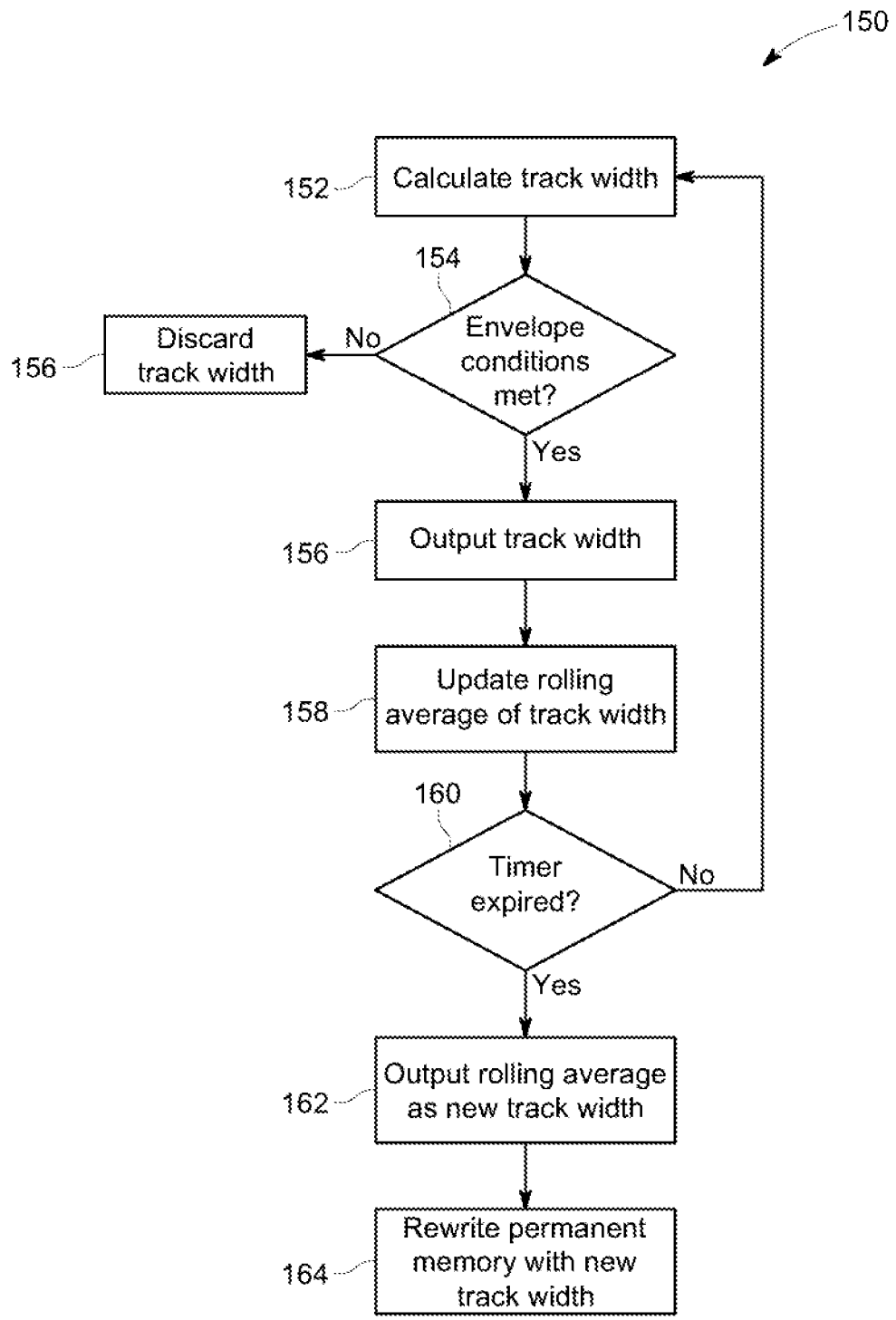
FIG. 4 is a flow chart illustrating logic for rewriting a saved track width within memory of a controller.

Referring to FIG. 4, a method 150 of rewriting a saved track width in permanent memory of the controller 50 generally includes repeatingly calculating track widths 134 until a timer expires, discarding unsuitable track widths, computing a rolling average of suitable track widths during the learning mode, and rewriting the saved track width with a new track width (which is the final rolling average) in permanent memory. The controls began at operation 152 where the controller calculates a track width. The track width may be calculated according to the controls 100 shown in FIG. 3 and described above. At operation 154 the controller determines if the envelope conditions were met while the track width 152 was calculated. If any of the envelope conditions are not met, control passes to operation 156 and the calculated track width is discarded. If yes, controls passes to operation 156 where the calculated track width of operation 152 is output. A most-current rolling average of suitable track widths is calculated at operation 158. The controller determines if a timer has expired at operation 160. The timer begins when the driver requests learning mode and expires after a predetermined amount of time. When the timer 160 expires, the driving and data collection portions of learning mode ends. If the timer has not expired, the controller will periodically calculate additional track widths and update the rolling average as necessary by repeating steps 152 through 158. If the timer 160 has expired, control passes to operation 162 where the final rolling average is output as a new track width. The controller may check the new track width to determine if within a threshold range such as 1.65 to 1.80 m. If the new track width is outside of this range, the new track width is considered invalid and is not used. At operation 164, the previous track width saved in memory is rewrote with the new track width of operation 162. This new track width is stored in permanent memory to be used by the vehicle controller 50 until learning mode is performed again in the future.

Figure 5:
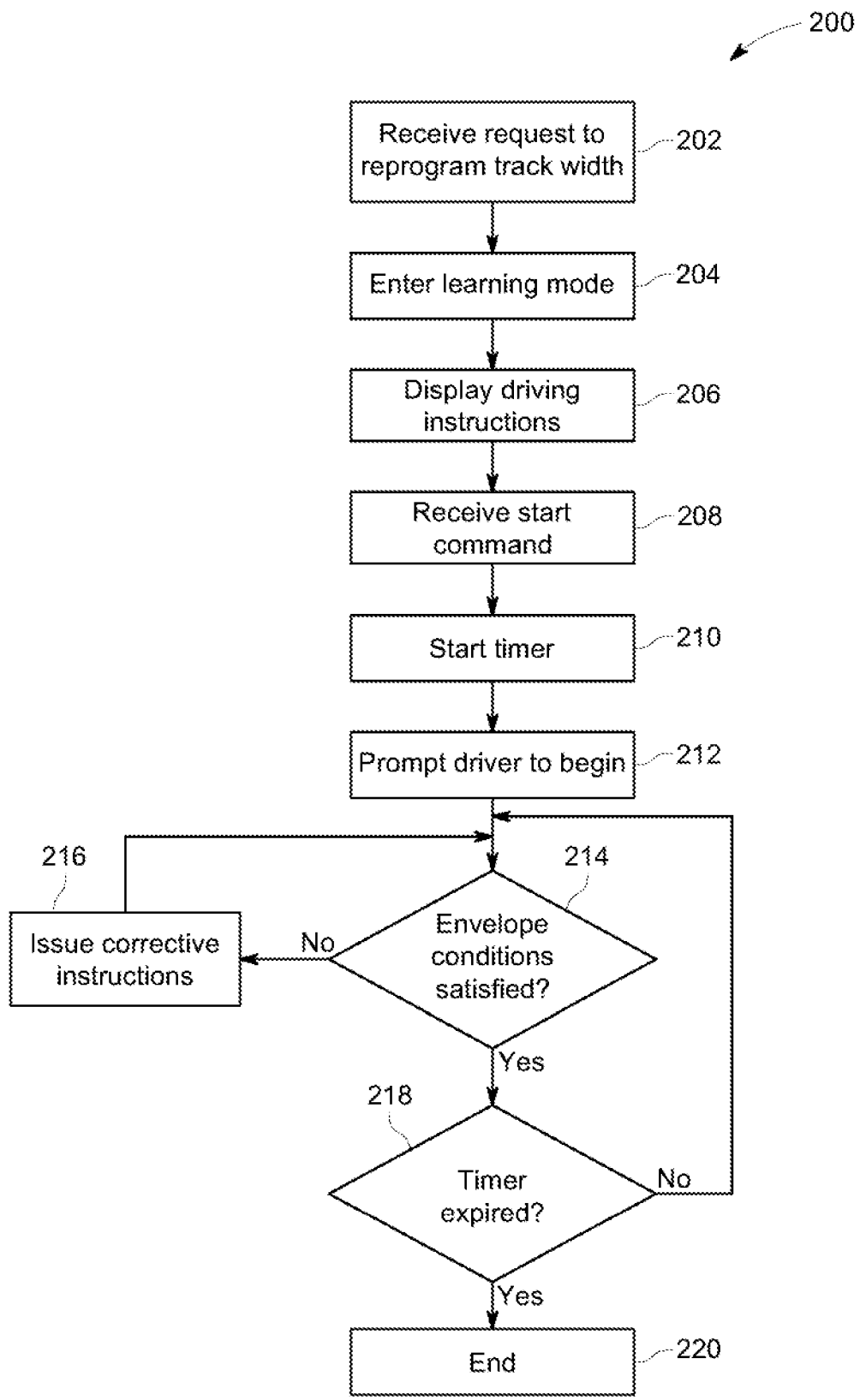
FIG. 5 is a flow chart illustrating logic for human-machine interfacing during a track width learning mode.

FIG. 5 illustrates control logic 200 for interfacing with the driver during track width learning mode. Track width learning mode is initiated by the driver. The driver may request reprogramming of the track width via the user interface 60. For example, the driver may press a button, such as button 66 or may access the learning mode menu through the touchscreen display 70. The controller receives the request to reprogram track width at operation 202 and enters learning mode at operation 204. Upon entering learning mode, the controller may display one or more pages associated with track width learning mode on the display 70, the display 74, or both. For example, the controller may command the display to show driving instructions for the learning mode at operation 206. The instructions delineate the appropriate maneuvers to be manually performed by the driver during learning mode, and may specify desired vehicle speeds, turning, braking, and the like. Once the driver has read through the instructions issued at operation 206, the controller may display a start button on the touchscreen. A start command is sent to the controller at operation 208 responsive to the driver selecting the start button, or pressing the start button if it is a physical mechanism.

The controller commences track width learning mode responsive to receiving the start command of operation 208, and starts a timer at 210. The controller then prompts the driver to begin maneuvers at operation 212. The controller may continue to provide driving instruction throughout learning mode, and the instruction may periodically change, e.g., begin by commanding right turns and later switch to commanding left turns, throughout the learning mode. The controller monitors various vehicle sensors to determine if any of the above-described envelope conditions have been violated at operation 214. For example, the controller may determine if vehicle speed is within the minimum and maximum thresholds or if vehicle yaw rate is within the minimum and maximum thresholds. If any of these envelope conditions are not satisfied, control passes to operation 216 where the controller issues corrective instructions. The instructions provided are tied to the particular envelope condition that is not being satisfied. For example, if the operator is exceeding the maximum speed threshold, the corrective instructions may include vehicle speed commands. The commands may be simple, such as "slow down" or may be more detailed such as command the driver to a certain speed. Similarly, if the vehicle yaw rate is outside the desired envelope, the corrective instructions may include steering commands. The steering commands may request the driver to steer more or less depending upon which corrective action is required.

The controller continuously monitors the envelope conditions and provides corrective instructions as necessary until the timer expires. The controller monitors the timer at operation 218. If the timer is not expired at operation 218, control loops back and learning mode continues. If the timer is expired at operation 218, learning mode is ended at operation 220. The controller may display a message on the user interface informing the driver that learning mode has ended and whether or not the track width was successfully updated. This menu may provide the driver with the option to restart learning mode. Indication of learning mode starting, stopping being successful, or not successful may also be done by a series of beeps/tones.

In an alternative embodiment, the vehicle controller may automatically enter a track width learning mode and calculate a track width when suitable driving conditions are occurring rather than the above-described driver-initiated track width learning mode. Here, the vehicle controller may receive signals from the above-described sensors and determine if the present condition are conducive to calculating vehicle track width. If the conditions are present, the controller will calculate a new track width as described above. The vehicle may be programmed to automatically calculate a new track width periodically, or a user may inform the vehicle controller that track width needs updating and the control then calculates a new track width when conducive conditions are detected.

The above-described track learning modes allow vehicle owners freedom to customize their vehicles while still maintaining optimum performance. The learning mode avoids the hassle and expense associated with dealer reprogramming and provides a simple built-in feature that allows owners to quickly and easily update the track width as often as needed.

While the above description focus on a rear differential and a rear track, the teachings of this disclosure are equally applicable to a front differential and a front track, if, for example, the vehicle 20 was front-wheel drive or all-wheel drive.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a driven axle including driven wheels each having an associated driven wheel-speed sensor;
   an undriven axle including at least one undriven wheel and having at least one associated undriven wheel-speed sensor;
   a yaw rate sensor; and
   a controller programmed to:
   responsive to a request to reprogram a track width of the driven axle, receive signals from the driven wheel speed sensors, the at least one undriven wheel-speed sensor, and the yaw rate sensor while the vehicle is in a track width learning mode and moving in a particular manner to learn the track width of the driven axle based on the signals, wherein the track width of the driven axle is computed by (i) calculating an average wheel speed of the driven wheels of the driven axle based on first signals from the driven wheel-speed sensors, (ii) subtracting a wheel speed of one of the at least one undriven wheel based on second signals from the at least one associated undriven wheel-speed sensor from the calculated average wheel speed of the driven wheels of the driven axle to determine a speed offset, (iii) dividing the speed offset by a yaw rate based on third signals from the yaw rate sensor to determine a distance, and (iv) utilizing at least the determined distance to calculate a learned track width of the driven axle, issue driving instructions to a driver for modifying the operation of the vehicle to achieve the particular manner during the track width learning mode; and discard the learned track width responsive to a vehicle speed exceeding a threshold while the driving instructions are executed.

2. The vehicle of claim 1, wherein the driving instructions include at least one of vehicle steering commands vehicle speed commands.

3. The vehicle of claim 1, wherein the learned track width is further computed by multiplying the distance by two.

4. A vehicle comprising:
a driven axle including driven wheels;
an electronic differential;
an undriven axle including at least one undriven wheel;
a yaw rate sensor configured to calculate a vehicle yaw rate; and
a controller programmed to:
responsive to a request to enter a track width learning mode, (i) calculate a track width of the driven axle derived from a difference between an average speed of the driven wheels and a speed of one of the at least one undriven wheel divided by the vehicle yaw rate, (ii) if learning conditions are satisfied during the calculation of the track width, update a rolling average of track widths using the track width as a learned track width, otherwise, discard the track width and maintain the rolling average of track widths as the learned track width, and (iii) responsive to a timer expiring, rewrite a previously stored learned track width in a permanent memory with the learned track width, and control the electronic differential to induce oversteer in the vehicle based on the learned track width.

5. The vehicle of claim 4, wherein the learning conditions include a vehicle speed threshold.

6. The vehicle of claim 4, wherein the learning conditions include a vehicle yaw rate threshold.

7. The vehicle of claim 4, further comprising wheel speed sensors each associated with one of the driven wheels and the at least one undriven wheel, wherein the wheel speeds are based on signals from the wheel speed sensors.

8. The vehicle of claim 4, wherein the controller is further programmed to issue driving instructions to a driver responsive to the vehicle being in the track width learning mode.

9. The vehicle of claim 8, wherein the driving instructions include vehicle speed commands and vehicle steering commands, and wherein the learning conditions will be met upon execution of the driving instructions.

10. The vehicle of claim 8, further comprising a display, wherein the controller is further programmed to output the driving instructions to the display.

11. A method of learning a track width of a vehicle comprising:
receiving a request to reprogram a stored track width of a driven axle;
responsive to the request, issuing driving instructions to a driver for modifying operation of the vehicle to achieve a particular vehicle state;
once the vehicle achieves the particular vehicle state:
measuring wheel speeds of driven wheels associated with the driven axle and a wheel speed of at least one undriven wheel associated with an undriven axle;
measuring a yaw rate of the vehicle;
calculating the track width of the driven axle based on a difference between an average of the measured wheel speeds of the driven wheels and a wheel speed of one of the at least one undriven wheel, and further based on the difference divided by the yaw rate; and
either overwriting the stored track width of the driven axle with the calculated track width of the driven axle or else discarding the calculated track width responsive to a vehicle speed exceeding a threshold while the driving instructions are executed.

12. The method of claim 11, wherein the driving instructions include vehicle speed commands and vehicle steering commands.

* * * * *